B. HURD.
MACHINE FOR CUTTING RAILS.
APPLICATION FILED DEC. 2, 1903.
959,142.
Patented May 24, 1910.
2 SHEETS—SHEET 1.
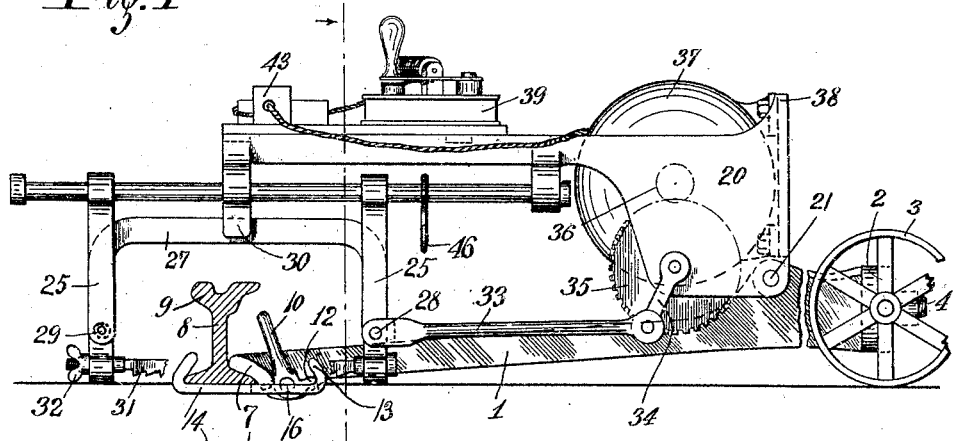
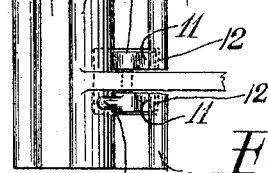
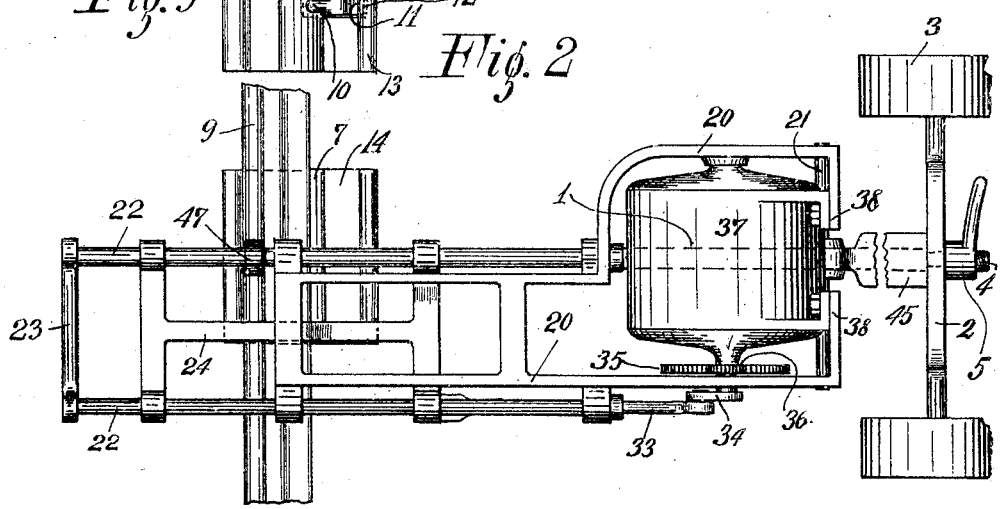
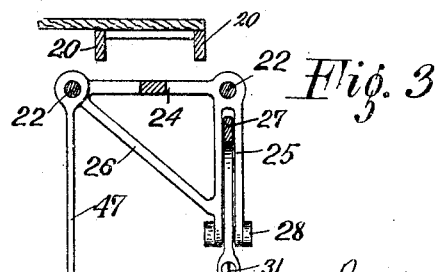
Witnesses
Julian S. Wooster
Ivan Königsberg
Inventor
Benjamin Hurd
By his Attorney
C. W. Edwards

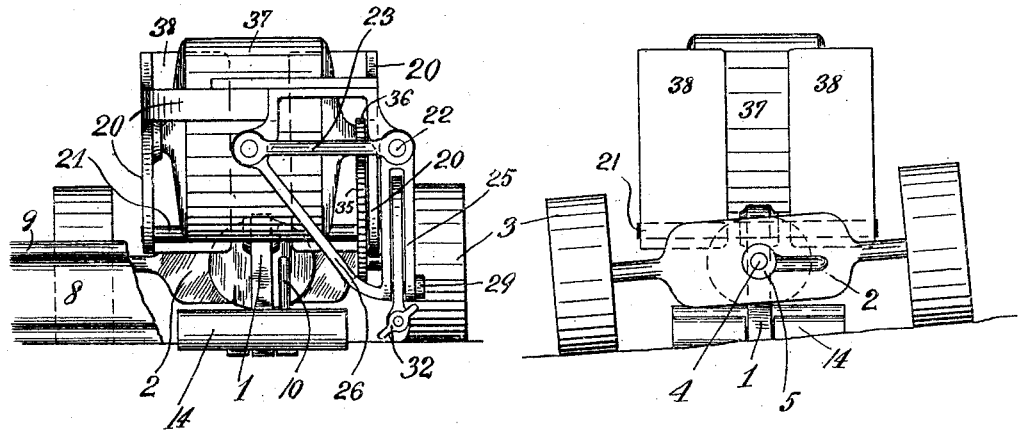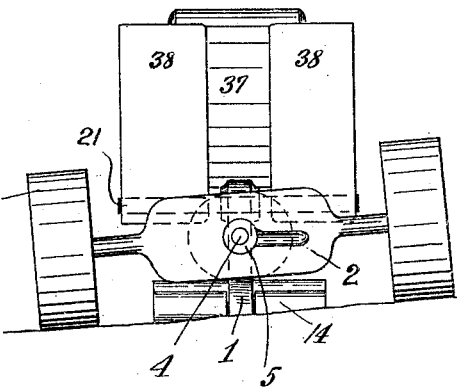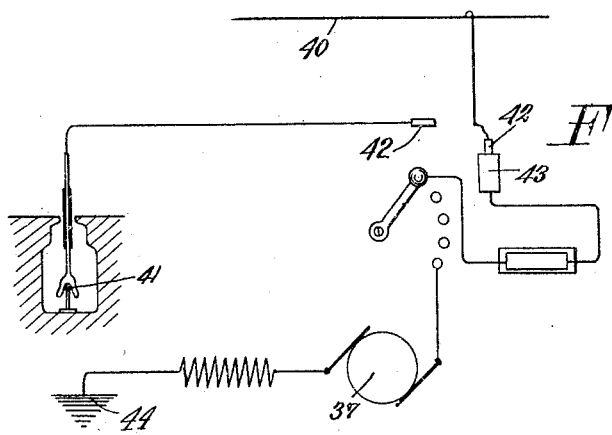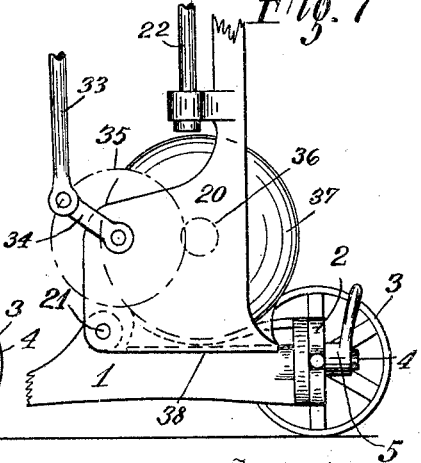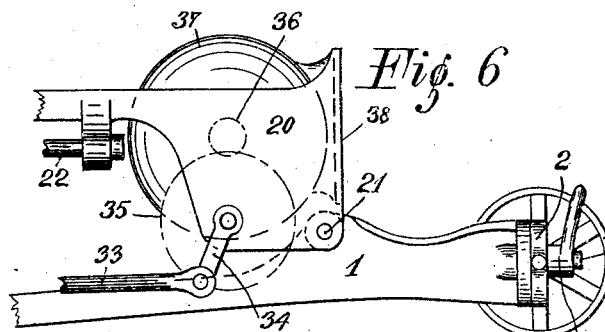

UNITED STATES PATENT OFFICE.

BENJAMIN HURD, OF NUTLEY, NEW JERSEY.

MACHINE FOR CUTTING RAILS.

959,142.   Specification of Letters Patent.   Patented May 24, 1910.

Application filed December 2, 1903. Serial No. 183,440.

*To all whom it may concern:*

Be it known that I, BENJAMIN HURD, citizen of the United States, residing at Nutley, in the county of Essex and State of New Jersey, have invented certain new and useful Improvements in Machines for Cutting Rails, of which the following is a full, clear, and exact specification.

This invention relates to machines for cutting rails, and its object is to provide a portable, power driven machine with which rails and other material may be quickly and accurately cut, at a great saving in cost and time over hand cutting.

On all railroads, and particularly on street railroads, where welded joints are largely used, it is frequently necessary to cut rails and other material. This work has heretofore been commonly done in a very slow and expensive manner by hand, and the object of this invention is to provide a portable machine for this purpose which shall be suited to practical conditions. The hardness of rails varies considerably in different rails, and even in different parts of the same rail, so that it is desirable to provide a feeding mechanism which will permit the blade to cut according to the hardness of the material. If the cutting blade is fed a certain distance at each stroke, it may cause the blade to be worn out instead of cutting, when working on hard material; and, on the other hand, with soft material the feed may not be as fast as the blade can cut, thus entailing loss of time. I have provided a feed mechanism which feeds according to the cut made, and which is thus independent of the degree of hardness of the material. In machines of this class, it is also desirable to provide mechanism for clamping the machine to the work, which will permit the cutting mechanism to be swung to and from the work without losing the adjustment, so that a car, for instance, may be allowed to pass with but a slight interruption in the work.

The machine will be more fully described with reference to its parts, functions and combinations, in connection with the accompanying drawings, in which—

Figure 1, is a side elevation partly in section showing the machine in position, Fig. 2, is a top plan view. Fig. 3, is an end view in detail, of the cutting frame, Fig. 4 is a front elevation, Fig. 5 is a rear elevation. Fig. 6, is a detached side elevation of the rear end of the machine, Fig. 7 is a detail showing the position when swung up out of position, Fig. 8, is a diagram of the power circuits for feeding the motor from an electric railway. Fig. 9 is a plan view of the clamping mechanism.

1 represents the frame of the machine comprising a heavy longitudinal bar on the rear end of which is pivotally mounted the axle 2 having the wheels 3. The axle is pivoted on a threaded stud 4 attached to the frame and is clamped in position by a wing nut or other suitable clamping device 5. The forward end of the frame has a wide cross bar or jaw 7 attached thereto which is adapted to rest against the web 8 of the rail 9 and is shaped on its under side so as to conform to the configuration of the base of the rail. See Figs. 1 and 9.

Mounted in the lower portion of the end of the frame bar 1 is a locking lever 10 pivoted at 16. This lever, for convenience is preferably made angular, the short end 11 having the laterally extending end 12 adapted to engage with the hooked end 13 of a clamping shoe 14. To clamp the rail, the upper end 10 is swung backward until the laterally extending end 12 can be hooked under the end 13 of the shoe 14. Then the end 10 is pushed toward the rail until the outer end 12 of the lever is slightly above the pivot 16. This forms in effect a toggle lever and cannot work loose until the toggle is broken by swinging the end 10 away from the rail. Both ends of the clamping shoe are alike, so that either end can engage the rail, or the end 12 of the locking lever. The bases of rails vary slightly in width and to meet this, various lengths of shoes can be used. If desired any other efficient clamping means for clamping the base of the rail may be used instead. By clamping the base of the rail it will be seen that there will be no interference with the passage of a car on account of the position of the clamps.

The cutting mechanism is pivotally mounted on the frame 1 so that it can be swung out of position without interfering with the clamping mechanism. 20, 20, are two side plates rigidly connected together and forming a supplementary frame carrying the operative parts of the machine. The supplementary frame is pivotally mounted on the main frame at 21, so that it, with the parts supported thereby, can be swung to the position shown in Fig. 7. Rigidly mounted in the supplementary frame, are the guide rods 22, connected by a bar 23. Mounted on the guide rods 22 is a crosshead 24, which may be of any suitable construction. Depending from each end of the crosshead on one side are the bifurcated standards 25 and connected with the other side of the crosshead by diagonal braces 26. See Fig. 3. The cutting frame is pivotally mounted at 28 in the standards 25 and rigidly supported against lateral movement by the legs of the standards. 29 is a pin preferably in the outer standard and passing through an enlarged hole in the cutting frame for holding the cutting frame in engagement with the standards when being swung on the pivot 21. This is to normally permit a slight pivotal movement of the cutting frame on the pivot 28, so that it will not bind, the standards preventing lateral movement. Depending from the end of the supplementary frame is a jaw 30, which slidably engages the upper side of the cutting frame. 31 is a cutting blade and 32 a wing nut for giving the proper tension to the blade. It will thus be seen that the tension of the cutting frame is not transmitted to the bearings of the crosshead. The cutting frame is reciprocated by a connecting rod 33 attached to the pin 28 which is in approximately the line of cut, crank 34, gear 35, and pinion 36 on the armature shaft of a motor 37, which is attached to the end plates 38 of the supplementary frame.

39 is a suitable starting box for controlling the motor 37.

Fig. 8 shows the connections for using power from an overhead line 40, or an underground line 41.

43 is a plug connection adapted to connect with either source of power through the plugs 42. The motor may be connected with the return circuit as at 44 and may be of any suitable type.

47 is a gage for insuring that the cut shall be perpendicular to the work, independent of the clamp. The gage comprises a bar pivoted preferably on the guide rod, and of such length that when perpendicular it will just touch the surface of the work when the cutting blade rests thereon, if the adjustment is correct to give a perpendicular cut. If the adjustment should not be correct the end of the gage would either not touch the work at all or else it would touch before it reached perpendicular position. When not in use the gage may be swung up to rest on the machine out of the way. I do not restrict myself to a gage pivoted on the guide rod, as it will be obvious that it may be pivoted elsewhere and perform the same function, if properly proportioned as to length.

When it is desired to permit a car to pass, the motor and cutting frame are swung upward to the position shown in Fig. 7, the frame 1 being formed with a stop 45 to firmly support the motor in the upright position.

In some places, it may be desired to cut a rail where the ground on which the wheels rest inclines differently from the rail. To meet this difficulty and be able to secure a right angled cut, the axle can be turned to rest on the ground at any angle, relatively to the work, as in Fig. 5. It will be noticed that the clamping mechanism always clamps the work parallel to the pivot 21 and thus insures that the cut will be perpendicular.

Any other means for operating the cutting frame may be used if desired, but on electric roads, where this machine will have a large use, the cost of power in comparison with hand work is negligible, and an electric motor is therefore the most convenient means for driving the machine. The feeding is accomplished by the weight of the parts in front of the pivot 21, which may be distributed as desired in order to secure the best results. It will thus be seen that the feed can only take place as the material is cut, which will depend upon the character of the work.

When the machine is being moved around, the frame 1 may be hooked to the guide rods by a suitable hook 46, the bar 23 serving as a handle. It will be seen that when being moved around, the weight will be disposed over the axle, so that there will be very little to be supported elsewhere. It will thus be seen that I have provided a machine which can be easily swung out of the way and which will be capable of use in various positions, and, by using a gravity feed will not feed the cutting blade beyond its capacity as might happen where a positive feed is used which cannot be closely proportioned to the hardness of the work. After the blade has cut its own depth the feed can be increased as much as desired by adding additional weights with slight danger of breaking the blade because it will be supported by the sides of the cut.

It will be obvious that the machine may be used in various other kinds of work than railroad work, as for instance, in shops where the machine can be transported to the place where needed; in the erection of steel buildings, etc., and that a power driven portable machine will have many advantages in such work. The parts are simple and can be easily renewed. The ordinary hack saw blade can also be used instead of special blades, and a considerable saving in the cost of blades secured, as many blades are broken by careless handling in hand cutting.

Modifications and changes may be made without departing from the scope of the invention, and I do not desire to be limited to the exact construction shown and described.

Having thus described my invention, I declare that what I claim as new and desire to secure by Letters Patent, is,—

1. In a portable cutting machine, the combination of a truck, a main frame mounted thereon having means for clamping the work, a supplementary frame and motor mounted to move relatively to said main frame, a saw mounted in said supplementary frame, and driving connections between said motor and said saw, substantially as described.

2. In a portable cutting machine, the combination of a truck, a main frame mounted thereon having means for clamping the work, a supplementary frame carrying a motor, pivotally mounted on said main frame, a saw mounted in said supplementary frame, and driving connections between said motor and said saw, substantially as described.

3. In a portable cutting machine, the combination of a truck, a main frame mounted thereon having means for clamping the work, a supplementary frame carrying a motor, pivotally mounted on said main frame, a reciprocating saw mounted in said supplementary frame, and driving connections between said motor and said reciprocating saw, substantially as described.

4. In a portable cutting machine, the combination of a main frame having a truck on one end, and a work clamping mechanism on the other end, a supplementary frame carrying a motor, mounted on said main frame, a cutting mechanism carried by said supplementary frame and disposed in proximity to the clamping mechanism, and driving connections between said motor and said cutting mechanism, substantially as described.

5. In a rail cutting machine, the combination with clamping means, of a frame carrying a motor and cutting mechanism, said frame being pivotally mounted relatively to said clamping mechanism, substantially as described.

6. In a rail cutting machine, the combination of a frame carrying a motor, a reciprocating crosshead mounted on said frame, connection between said motor and said cross-head, and a cutting frame pivotally mounted in said cross-head, substantially as described.

7. In a rail cutting machine, the combination with clamping means, of a frame carrying a motor and cutting mechanism, said frame being pivotally mounted relatively to said clamping mechanism and having the center of gravity of the parts carried thereby between the pivot and the work, substantially as described.

8. In a rail cutting machine, the combination of a main frame, comprising a truck and work clamping devices pivotally mounted on the truck to permit angular variation between the work and the axis of the truck, means for locking the truck to the work clamping frame to prevent relative movement while the frame is clamped to the work, a cross-head slidably mounted in said frame and moving transversely of the truck, a reciprocatory cutting mechanism carried by the said cross-head, a motor mounted on said frame and having an actuating connection with said cutting mechanism, and means whereby the motor and the cutting mechanism can be swung to and from the work independently of the clamping devices.

9. In a rail cutting machine, the combination with a driving mechanism, of a cross-head having bifurcated standards at opposite ends, a cutting frame pivotally mounted in said crosshead and adapted to carry a cutting blade under tension, the cutting frame being pivoted to one of said standards and held against lateral movement by the other, so that no strain from the tension of the cutting blade is transmitted to the bearings of the crosshead, substantially as described.

10. In a portable cutting machine, the combination of a main frame, a motor and cutting mechanism pivotally mounted thereon, means for clamping the machine to the work independently of the cutting mechanism, whereby the cutting mechanism can be swung to and from the work without affecting the clamping mechanism, and a truck attached to said main frame and supporting the latter, substantially as described.

11. In a rail cutting machine, the combination with means for clamping the base of the rail, of a frame pivotally mounted thereon and carrying a cutting mechanism at one end and an actuating motor located between the pivot and the cutting end, whereby to permit the cutting mechanism and motor to be swung out of operative position to permit a car to pass and the weight of the motor to feed the cutting tool, substantially as described.

12. In a portable cutting machine, the combination with a main frame carrying work-clamping mechanism and cutting mechanism, of a truck adjustable relatively thereto to compensate for different levels of the truck and work, said cutting mechanism comprising a frame, relatively to which the cutting tool has a fixed plane of movement, and means carried by the frame adjacent the cutting mechanism for determining the adjustment of the frame relatively to the truck to give the desired angle of cut, and means for locking the frame and truck to maintain the adjustment when once obtained, substantially as described.

13. In a portable cutting machine, the combination with guide rods carrying a cross-head and cutting mechanism, of a gage pivoted on one of said guide rods at a distance laterally from the cutting frame, and adapted to contact with the work in order to indicate the position for a perpendicular cut, and means for setting the cutting mechanism to cut accordingly, substantially as described.

In testimony whereof I affix my signature, in presence of two witnesses.

BENJAMIN HURD.

Witnesses:
    JULIAN S. WOOSTER,
    HENRY BEST.